United States Patent
Haase et al.

(10) Patent No.: US 9,774,045 B2
(45) Date of Patent: Sep. 26, 2017

(54) EXHAUST AIR GUIDE OF A FUEL CELL STACK IN A MOTOR VEHICLE

(71) Applicant: Bayerische Motoren Werke Aktiengesellschaft, Munich (DE)

(72) Inventors: Stefan Haase, Munich (DE); Marcel Sterzenbach, Landshut (DE); Marco Schwarze, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/001,402

(22) Filed: Jan. 20, 2016

(65) Prior Publication Data

US 2016/0133958 A1  May 12, 2016

Related U.S. Application Data

(63) Continuation of application No. PCT/EP2014/061761, filed on Jun. 5, 2014.

(30) Foreign Application Priority Data

Jul. 25, 2013  (DE) .................. 10 2013 214 602

(51) Int. Cl.
*H01M 8/04* (2016.01)
*H01M 8/04007* (2016.01)
(Continued)

(52) U.S. Cl.
CPC ......... *H01M 8/04074* (2013.01); *B60L 1/003* (2013.01); *B60L 11/1892* (2013.01);
(Continued)

(58) Field of Classification Search
CPC ................ H01M 8/04014; H01M 8/04074
See application file for complete search history.

(56) References Cited

U.S. PATENT DOCUMENTS

| 5,981,096 A * | 11/1999 | Hornburg | .......... | H01M 8/04186 429/410 |
| 2004/0121199 A1* | 6/2004 | Balan | ................ | H01M 8/04022 429/415 |

(Continued)

FOREIGN PATENT DOCUMENTS

| CN | 2916940 Y | 6/2007 |
| CN | 200950457 Y | 9/2007 |

(Continued)

OTHER PUBLICATIONS

International Search Report (PCT/ISA/210) issued in PCT Application No. PCT/EP2014/061761 dated Sep. 17, 2014 with English-language translation (four (4) pages).

(Continued)

*Primary Examiner* — Olatunji Godo
(74) *Attorney, Agent, or Firm* — Crowell & Moring LLP

(57) ABSTRACT

An exhaust air guide of a fuel cell stack is provided, in particular in a motor vehicle, with a cooling device which belongs to the functional environment of the fuel cell stack and is in the form of a cooler structure through which ambient air flows. At least some of the exhaust air of the fuel cell stack is guided into the cooler structure or behind the cooler structure, as viewed in the direction of flow of the ambient air through the cooler structure, to such an extent that, at the cooler structure, the exhaust air flow brings about an increase in the mass flow of the ambient air through the cooler structure in accordance with the jet pump principle or, at the cooler structure, the exhaust air flow, in accordance with the jet pump principle, brings about a pressure difference conveying at least a portion of the ambient air through the cooler structure.

10 Claims, 3 Drawing Sheets

(51) Int. Cl.
  *B60L 1/00*     (2006.01)
  *B60L 11/18*    (2006.01)
  *H01M 8/04014*  (2016.01)

(52) U.S. Cl.
  CPC ..... *B60L 11/1898* (2013.01); *H01M 8/04014* (2013.01); *H01M 2250/20* (2013.01); *Y02T 90/32* (2013.01); *Y02T 90/34* (2013.01)

(56) References Cited

U.S. PATENT DOCUMENTS

| | | |
|---|---|---|
| 2008/0196956 A1 | 8/2008 | Koenekamp et al. |
| 2011/0287330 A1 | 11/2011 | Kuehn et al. |
| 2011/0300457 A1 | 12/2011 | Kuehn et al. |
| 2013/0139997 A1 | 6/2013 | Murakami et al. |
| 2015/0111123 A1 | 4/2015 | Haase et al. |

FOREIGN PATENT DOCUMENTS

| | | |
|---|---|---|
| DE | 10 2008 009 118 A1 | 9/2008 |
| DE | 10 2008 029 529 A1 | 10/2009 |
| DE | 11 2009 003 573 T5 | 7/2012 |
| DE | 11 2009 003 549 T5 | 9/2012 |
| DE | 11 2009 003 572 T5 | 11/2012 |
| DE | 10 2012 206 459 A1 | 10/2013 |
| JP | 2002-184419 A | 6/2002 |
| WO | WO 2014/005793 A2 | 1/2014 |

OTHER PUBLICATIONS

German Search Report issued in counterpart German Application No. 10 2013 214 602.7 dated Jan. 15, 2014 with partial English-language translation (ten (10) pages).

German-language Office Action issued in counterpart European Application No. 14728945.8 dated Jan. 31, 2017 (Six (6) pages).

Chinese Office Action issued in counterpart Chinese Application No. 201480041866.5 dated Oct. 26, 2016 with English-language translation (eight (8) pages).

Chinese-language Office Action issued in counterpart Chinese Application No. 201480041866.5 dated Mar. 9, 2017 with partial English translation (five (5) pages).

European Office Action issued in counterpart European Application No. 14 728 945.8 dated Jun. 20, 2017 (seven pages).

\* cited by examiner

EXHAUST AIR GUIDE OF A FUEL CELL STACK IN A MOTOR VEHICLE

CROSS REFERENCE TO RELATED APPLICATIONS

This application is a continuation of PCT International Application No. PCT/EP2014/061761, filed Jun. 5, 2014, which claims priority under 35 U.S.C. §119 from German Patent Application No. 10 2013 214 602.7, filed Jul. 25, 2013, the entire disclosures of which are herein expressly incorporated by reference.

BACKGROUND AND SUMMARY OF THE INVENTION

The invention relates to an exhaust-air guide of a fuel cell stack, in particular in a motor vehicle, having a cooling device which belongs to the functional environment of the fuel cell stack and which is in the form of a cooler structure through which ambient air flows. With regard to the prior art, reference is made, by way of example, to DE 10 2008 029 529 A1.

Fuel cells, at least those of PEM type of construction, must be cooled during operation. For this reason, a suitable cooling device must be provided for a so-called fuel cell stack formed by a stack of multiple individual fuel cells. A cooling device of this type is normally formed by a circuit for a heat carrier medium and a heat transfer means, in particular a heat exchanger, in which circulated heat carrier medium, which absorbs heat in the fuel cell stack, releases said received amount of heat to an ambient air flow conducted through the heat transfer means, in particular the heat exchanger, referred to in the present case in generalized form as cooler structure. Also known, however, are air-cooled fuel cell stacks which themselves form or include a suitable cooler structure past which or through which an ambient air flow is conducted for cooling purposes, in this regard, cf. for example the as yet unpublished German patent application having reference number 102012206459.1. Here, in most cases, for the delivery of the ambient air flow through the cooler structure—be it an independent heat transfer means (in particular a heat exchanger) or a cooler structure integrated in the fuel cell stack—an independent delivery device (blower, fan, etc.) is required, which in some cases has a relatively high energy requirement.

The problem addressed by the present invention is that of specifying an improvement in this regard.

The solution to the problem consists in an exhaust-air guide of a fuel cell stack, in particular in a motor vehicle, having a cooling device which belongs to the functional environment of the fuel cell stack and which is in the form of a cooler structure through which ambient air flows, wherein at least a part of the exhaust air of the fuel cell stack is conducted into the cooler structure, or downstream of the cooler structure as viewed in the throughflow direction of the ambient air through the cooler structure, such that the exhaust-air flow gives rise, at the cooler structure, to an increase in the mass flow of the ambient air through the cooler structure in accordance with the jet pump principle (specifically in relation to the ambient air mass flow that prevails, with otherwise unchanged boundary conditions, without the approach according to the invention of conducting fuel cell exhaust air to the cooler structure). In other words, the exhaust-air flow conducted in suitable fashion to the cooler structure is intended to give rise, at the cooler structure and in accordance with the jet pump principle, to a pressure gradient which at least partially delivers the ambient air through the cooler structure.

According to the invention, the exhaust air of the fuel cell stack—in the case of PEM fuel cells, this is the cathode exhaust-air flow—is at least partially conducted to the cooler structure such that the pressure or positive pressure of the exhaust-air flow is utilized for the delivery of ambient air as cooling air which flows through the cooler structure. Here, the fundamentally known jet pump principle (known in particular from a suction jet pump formed by a suitable merging of pipes) is utilized. Here, it is expressly pointed out that, on a cooler structure according to the invention, it is by no means imperative for the fuel cell exhaust air and the ambient air to be explicitly merged in a pipe structure; rather, it suffices for the exhaust air of the fuel cell stack to be suitably conducted into the cooler structure or downstream of the cooler structure (as viewed in the throughflow direction of the ambient air through the cooler structure), for example in multiple pipes oriented at least approximately parallel to the inflow surface of the cooler structure, from which pipes the exhaust air emerges via outlet openings in the wall of said pipes ("pipe wall"). The outlet openings are oriented at a suitable angle with respect to the throughflow direction of the (desired) cooling air flow through the cooler structure. At all times, it is possible in the proposed way for the pressure potential that exists in the exhaust-air flow of the fuel cell stack to be utilized for the delivery of ambient air and thus of cooling air through the cooler structure, in such a way that the exhaust-air flow gives rise to an increase of the mass flow of ambient air compared with the ambient air mass flow that prevails, for otherwise unchanged boundary conditions, without the approach according to the invention of conducting fuel cell exhaust air to the cooler structure.

As regards the fuel cell exhaust air conducted in accordance with the invention, or the exhaust-air flow, the pressure potential or positive pressure thereof results from the prior delivery of ambient air as reaction air into the fuel cell stack, which ambient air reacts there in a known manner on one of the electrodes—on the cathodes in the case of a PEM fuel cell—with the fuel flow (in particular in the form of hydrogen) that is conducted to the other side of the respective cathode-electrolyte-anode unit, before the ambient air is subsequently discharged from the fuel cell stack as an exhaust-air flow. Normally, the temperature and, in particular, the moisture content of the exhaust air of the fuel cell stack is increased in relation to the ambient air that is initially supplied, as reaction air, to the fuel cells. In an advantageous refinement of the invention, it is therefore possible for the exhaust air of the fuel cell stack to be cooled, before being conducted in accordance with the invention to the cooler structure, in a suitable heat transfer means, in particular a heat exchanger (preferably again with the aid of ambient air), wherein moisture advantageously condenses out, such that no fogging as would otherwise normally occur, arises as a result of the exhaust-air flow of the fuel cell stack.

In one advantageous refinement of the present invention, the flow speed and/or flow direction of the fuel cell exhaust-air flow relative to the cooler structure, and thus for example the outflow direction and/or the outflow speed of the exhaust air out of the pipes, and generally from any system by way of which the fuel cell exhaust air is conducted in the manner according to the invention to the cooler structure, may vary in a targeted fashion. For example, for this purpose, the outlet openings in the pipe wall of the pipes may be varied by way of a slide or the like. By means of slides, it is for example possible for the cross-sectional area of the outlet openings to be variable, giving rise to different flow speeds for the fuel cell exhaust-air flow; by way of slides or the like, it is however also possible for the flow direction of the exhaust-air flow relative to the cooler structure to be varied in a desired manner. In the case of the pipes mentioned by way of example, through which the fuel cell exhaust air is conducted into or downstream of the cooler structure, it is however also possible for the one or more pipes themselves to be rotatable about their longitudinal axis, and thus for the flow direction of the exhaust-air flow emerging from the one or more pipes relative to the cooler structure to be varied. If multiple pipes are provided, through which the fuel cell exhaust air is conducted to the cooler structure, it is also possible, in a manner dependent on a wide variety of boundary conditions, for some of the pipes to be, in effect, deactivated, that is to say to not be charged with fuel cell exhaust air, whereby the entire exhaust-air flow is distributed among a smaller number of pipes, and thus the flow speed of the exhaust-air flow in the smaller number of pipes, and consequently also the outlet speed out of the pipe, are increased. At this juncture, it is expressly pointed out that it is by no means imperative for the fuel cell exhaust-air flow to be conducted to the cooler structure via multiple pipes with outlet openings provided in the pipe wall, as is optionally proposed; rather, for this purpose, use may also be made of other air-guiding systems. Here, control of the mass flow distribution by way of suitable geometric adaptations is self-evidently again possible.

If the fuel cell exhaust-air flow is, in the manner according to the invention, conducted at least partially into the cooler structure and the cooler structure is an otherwise conventional vehicle cooler with pipes which conduct a cooling liquid and on which there are provided cooling fins along which the ambient air flows as cooling air, it is possible, in order to realize a particularly compact design, for the pipes which conduct the exhaust-air flow to form, at least in sections, a structural unit with the pipelines that conduct the cooling liquid, for example in the form of a pipe with a partition running along the pipe axis.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
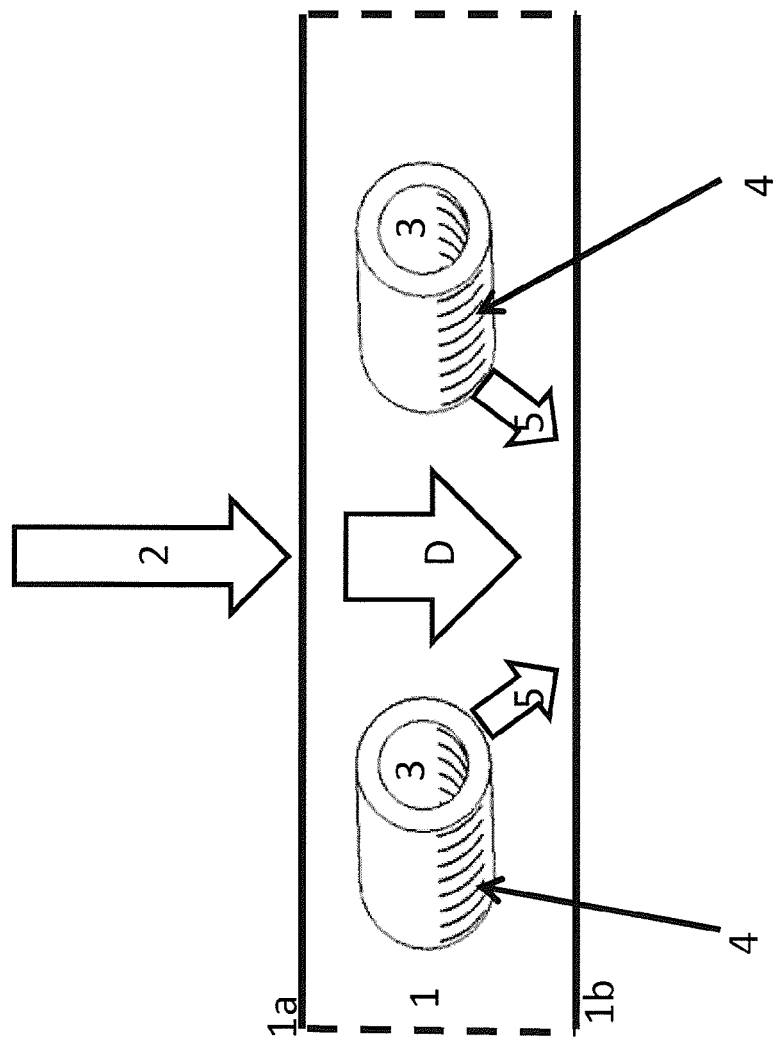
FIG. 1 is a highly schematic diagram in a plan view of a cooler structure with exhaust air of a fuel cell stack being conducted in accordance with an embodiment of the invention.

The appended diagrammatic sketches (FIG. 1, FIG. 2 and FIG. 3) show three exemplary embodiments of the invention, wherein each figure shows, in highly abstract form, a plan view of a cooler structure 1 with the exhaust air of a fuel cell stack being conducted in the manner according to the invention. The cooler structure 1 is integrated into the front-end region of a motor vehicle (not illustrated), in particular a passenger motor vehicle, wherein, in the vehicle, there is provided a fuel cell stack (likewise not illustrated) which is cooled with the aid of the cooler structure 1 by way of a cooling liquid circuit. The cooler structure 1 is, for example, in the form of a substantially conventional air-water heat transfer device, in particular a heat exchanger, such as is installed in a variety of embodiments in motor vehicles in the front-end region thereof in the form of a "cooler" for the purposes of cooling an internal combustion engine, which functions as a "modern" motor vehicle drive assembly. At the installation location, the cooler structure 1 is impinged on in a particularly effective manner by the relative wind of the moving motor vehicle. The inflow direction of the ambient air that flows through the cooler structure 1 while the vehicle is in motion is, in this case, illustrated by an arrow 2, from which it can be seen that the inflow surface 1a of the cooler structure 1 for the ambient air 2 (the reference 2 is also used for ambient air) and the rear outflow surface 1b of the cooler structure 1 are perpendicular to the drawing plane.

It is thus possible for ambient air to flow, as per the arrow 2 or arrow D (D=throughflow direction), through the cooler structure 1 and, in so doing, absorb heat from a heat carrier medium which is not shown (preferably, water with an antifreeze agent is used as the heat carrier or coolant) and which is likewise conducted through the cooler structure 1 so as to be in heat-exchanging contact with the ambient air 2. Here, the cooler structure 1 is of fundamentally known construction, though this is not illustrated in detail in the present figures for the sake of simplicity. The cooler structure 1 is formed substantially by a multiplicity of suitably guided pipes in which the heat carrier medium flows and on which there is provided a multiplicity of fins over which the ambient air 2 flows as cooling air.

Also illustrated in the figures, however, are multiple pipes 3 which are led to the cooler structure 1 and which, in the present case, for each exemplary embodiment, are substantially vertically orientated, though a different orientation is possible. In the figures, the pipes 3 are however illustrated in a slightly perspective or oblique view for better clarity. The exhaust-air flow of the fuel cell stack is guided in the pipes 3, which are connected in parallel with respect to one another with regard to the medium conducted therein, that is to say a corresponding fraction of the entire exhaust-air flow of the fuel cell stack provided in the vehicle flows in each individual pipe 3. In the pipes 3, or in the pipe walls thereof, there are provided a multiplicity of outlet openings 4, arranged in such a manner that a small partial flow of fuel cell exhaust air emerges from the respective pipe 3 as per arrow 5 from each outlet opening 4. Below, the reference sign 5 will also be used for the fuel cell exhaust air itself.

Figure 2:
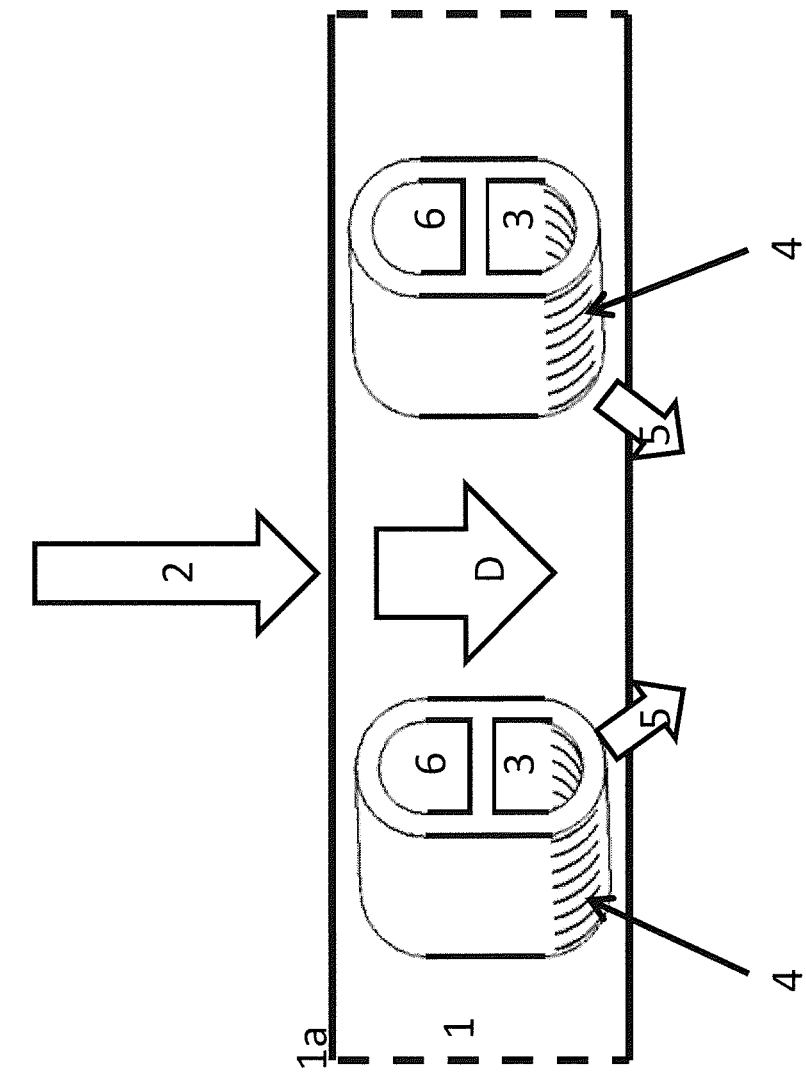
FIG. 2 is a highly schematic diagram in a plan view of a cooler structure with exhaust air of a fuel cell stack being conducted in accordance with another embodiment of the invention.

In the exemplary embodiments as per FIG. 1 and FIG. 2, the pipes 3 are arranged within the cooler structure 1, and thus the fuel cell exhaust air 5 emerging from the outlet openings 4 of the pipes 3 is conducted into the cooler structure 1 in such a way that the exhaust-air flow 5, in accordance with the jet pump principle, gives rise to a pressure gradient which at least partially delivers the ambient air through the cooler structure 1 as per arrow D (flow direction D). Here, the fuel cell exhaust air 5, which is under positive pressure with respect to the ambient pressure, emerging from the pipes 3 via the suitably oriented outlet openings 4 flows to the outflow surface 1b of the cooler structure 1 and, in the process, also entrains ambient air 2 through the cooler structure 1 as per arrow D, specifically utilizing the jet pump principle. Thus, at least, a relatively low delivery power is required for a delivery device, which must normally also be provided but which is not illustrated here, for an ambient air flow 2 through the cooler structure 1. (It may however be the case that no delivery device for ambient air whatsoever other than the cooling air flowing through the cooler structure 1 is required).

It is advantageously the case that, within the cooler structure 1, the fuel cell exhaust air 5 that is conducted into the cooler structure is simultaneously mixed with the throughflowing ambient air 2 and thereby diluted, such that even if the fuel cell exhaust air 5 is not previously cooled—as has been described above as an option—no fogging occurs as a result of condensing of the moisture contained in the fuel cell exhaust air 5.

Whereas it is the case in the embodiment as per FIG. 1 that the exhaust-air flow 5 of the fuel cell stack is conducted in independent pipes 3 into the cooler structure 1, it is the case in the exemplary embodiment as per FIG. 2 that the pipes 3 are formed as a structural unit with pipelines 6 in which the abovementioned heat carrier medium (="cooling liquid") is conducted through the cooler structure 1. The structural unit constitutes two pipes which are situated adjacent to one another and which are separated from one another in terms of flow, specifically in each case one pipeline 3 for the exhaust-air flow 5 and one pipeline 6 for the heat carrier medium which is to be cooled in the cooler structure 1 (by the ambient air 2 flowing through as per arrow D).

Figure 3:
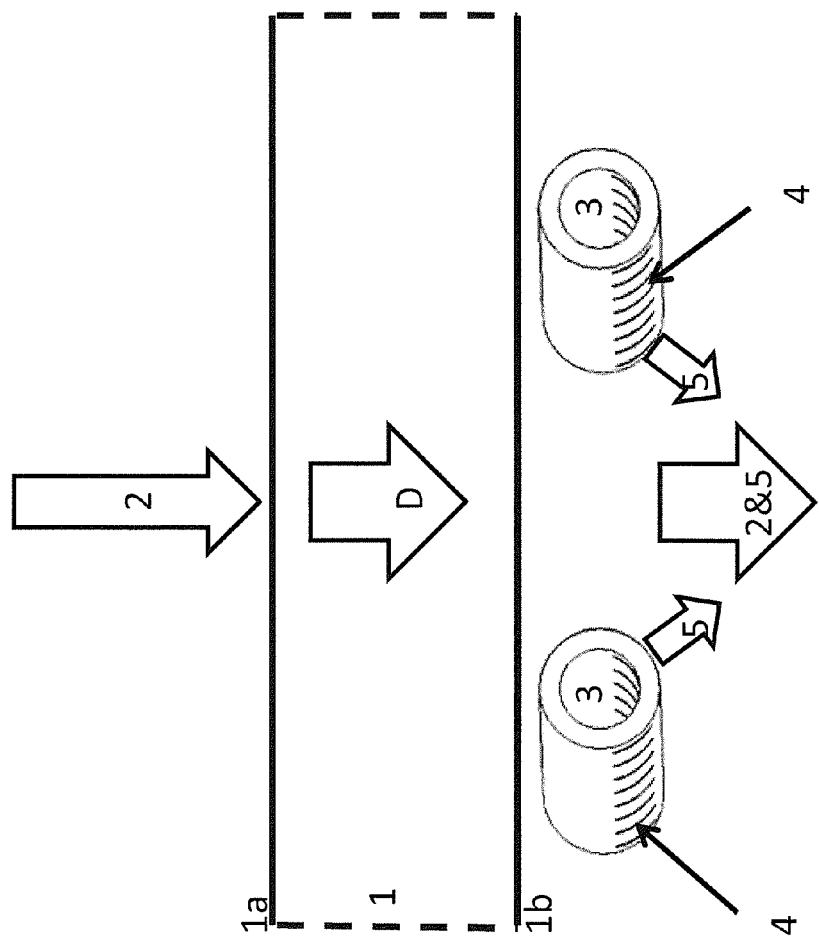
FIG. 3 is a highly schematic diagram in a plan view of a cooler structure with exhaust air of a fuel cell stack being conducted in accordance with yet another embodiment of the invention.

In the exemplary embodiment as per FIG. 3, the exhaust-air flow 5 is conducted downstream of the cooler structure 1 (as viewed in the flow direction D of the ambient air 2), that is to say the pipes 3, provided again here, with the outlet openings 4 for guiding and discharging the fuel cell exhaust-air flow 5 are situated close to the rear outflow surface 1b of the cooler structure 1. In this region, too, the exhaust-air flow 5 can give rise, at the cooler structure 1, to a pressure gradient which at least partially delivers the ambient air 2 through the cooler structure 1.

Not illustrated in the figures is also an advantageous refinement described further above, in which the outlet cross section and/or the outlet direction of the outlet openings 4 can be varied in a targeted fashion, for example by way of suitable rotary slides. Likewise not illustrated in the figures is an embodiment of a pipe 3 with a single outlet opening for the exhaust-air flow 5, which outlet opening extends in the direction of the pipe longitudinal axis over approximately the entire cooler structure 1, for example in the manner of a slot.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust-air guide of a fuel cell stack, comprising:
   a cooler structure through which ambient air flows, the cooler structure being a part of a functional environment of the fuel cell stack,
   wherein at least a part of exhaust air of the fuel cell stack is conducted into, or downstream of, the cooler structure viewed in a throughflow direction of the ambient air through the cooler structure, and
   wherein the conducted exhaust air is configured such that a flow of the exhaust air gives rise, at the cooler structure, to an increase of mass flow of the ambient air through the cooler structure by generating a pressure gradient which at least partially delivers the ambient air through the cooler structure.

2. The exhaust-air guide according to claim 1, wherein the flow of the exhaust air is cooled before being conducted into the cooler structure.

3. The exhaust-air guide according to claim 1, further comprising:
   multiple pipes in or downstream of the cooler structure into which the flow of the exhaust air is conducted,
   wherein the pipes are oriented at least approximately parallel to an inflow surface or an outflow surface of the cooler structure, and
   the flow of the exhaust air emerges from the pipes via outlet openings in pipe walls, the outlet openings being arranged at a suitable angle with respect to the throughflow direction of the ambient air.

4. The exhaust-air guide according to claim 2, further comprising:
   multiple pipes in or downstream of the cooler structure into which the flow of the exhaust air is conducted,
   wherein the pipes are oriented at least approximately parallel to an inflow surface or an outflow surface of the cooler structure, and
   the flow of the exhaust air emerges from the pipes via outlet openings in pipe walls, the outlet openings being arranged at a suitable angle with respect to the throughflow direction of the ambient air.

5. The exhaust-air guide according to claim 3, wherein the outlet openings in the pipe walls of the pipes are varied in order to vary a flow speed and/or a flow direction of the flow of the exhaust air relative to the cooler structure in a targeted manner.

6. The exhaust-air guide according to claim 5, wherein the outlet openings are varied by way of slides.

7. The exhaust-air guide according to claim 3, wherein the pipes conducting the flow of the exhaust air into the cooler structure form, at least in sections, a structural unit having pipelines that conduct a cooling liquid in the cooler structure.

8. The exhaust-air guide according to claim 5, wherein the pipes conducting the flow of the exhaust air into the cooler structure form, at least in sections, a structural unit having pipelines that conduct a cooling liquid in the cooler structure.

9. The exhaust-air guide according to claim 1, wherein the exhaust-air guide of the fuel cell stack is arranged in a motor vehicle.

10. The exhaust-air guide according to claim 1, wherein the pressure gradient is generated according to a jet pump principle.

* * * * *